UNITED STATES PATENT OFFICE.

WLADYSLAW HILDT, OF WARSAW, RUSSIA.

PROCESS OF DECOLORIZING VEGETABLE EXTRACTS CONTAINING TANNING SUBSTANCES.

1,053,034.  Specification of Letters Patent.  Patented Feb. 11, 1913.

No Drawing.  Application filed August 22, 1912.  Serial No. 716,482.

*To all whom it may concern:*

Be it known that I, WLADYSLAW HILDT, a subject of the Czar of Russia, and residing at Warsaw, Poland, Russia, have invented a certain new and useful Improved Process of Decolorizing Vegetable Extracts Containing Tanning Substances, of which the following is a specification.

My invention relates to processes of decolorizing vegetable extracts containing tanning-substances.

Extracts of parts of plants containing tanning-substances used for tanning leather, as *e. g.* extracts made from the bark of the mangrove tree, frequently contain reddish-brown coloring-matters which impart to the leather a dark color prejudicial to its use.

Now I have found by experiment that extracts of tanning-substances in general, and particularly extract of the bark of the mangrove tree, are very considerably clarified by the action of salts of stannous oxid in the presence of small quantities of alkalis.

In my improved process I utilize, on the one hand, the considerable reducing power of the salts of stannous oxid in the presence of alkali and, on the other hand, the power of tanning and coloring substances to form lakes with tin. Small quantities of a salt of tin suffice for the decoloration.

My improved process has the additional great advantage that no loss of tanning-substance occurs, as numerous analyses have confirmed, because the compounds of tin and tanning-substance which form are soluble in the presence of alkalis in an excess of the extract.

*Examples.*

I. *Decolorization of mangrove-extract.—* 5 kg. soda ($Na_2CO_3$) are first gradually stirred into 1000 liters mangrove-extract of 21° Bé. and then 5–6 kg. stannous chlorid ($SnCl_2$). The decolorization takes place on heating for a short time to 90° C.

II. *Decolorization of quebracho-extract.—* 1000 liters quebracho-extract of 21° Bé. are mixed with 8 kg. soda ($Na_2CO_3$) and 4–5 kg. stannous chlorid ($SnCl_2$) and heated for some time to 90° C.

I claim:—

1. A process of decolorizing vegetable extracts containing tanning-substances, consisting in treating the extracts by means of a stannous salt in the presence of a small quantity of an alkali.

2. A process of decolorizing mangrove-extract which consists in mixing the extract with soda and with stannous chlorid, and in heating the mixture thus obtained.

In testimony, that I claim the foregoing as my invention, I have signed my name in presence of two subscribing witnesses.

WLADYSLAW HILDT.

Witnesses:
 HENRY HASPER,
 ARTHUR SCHROEDER.

Copies of this patent may be obtained for five cents each, by addressing the "Commissioner of Patents, Washington, D. C."